J. VAUDREUIL.
DISH WASHING MACHINE.
APPLICATION FILED APR. 2, 1917.
1,262,717.
Patented Apr. 16, 1918.
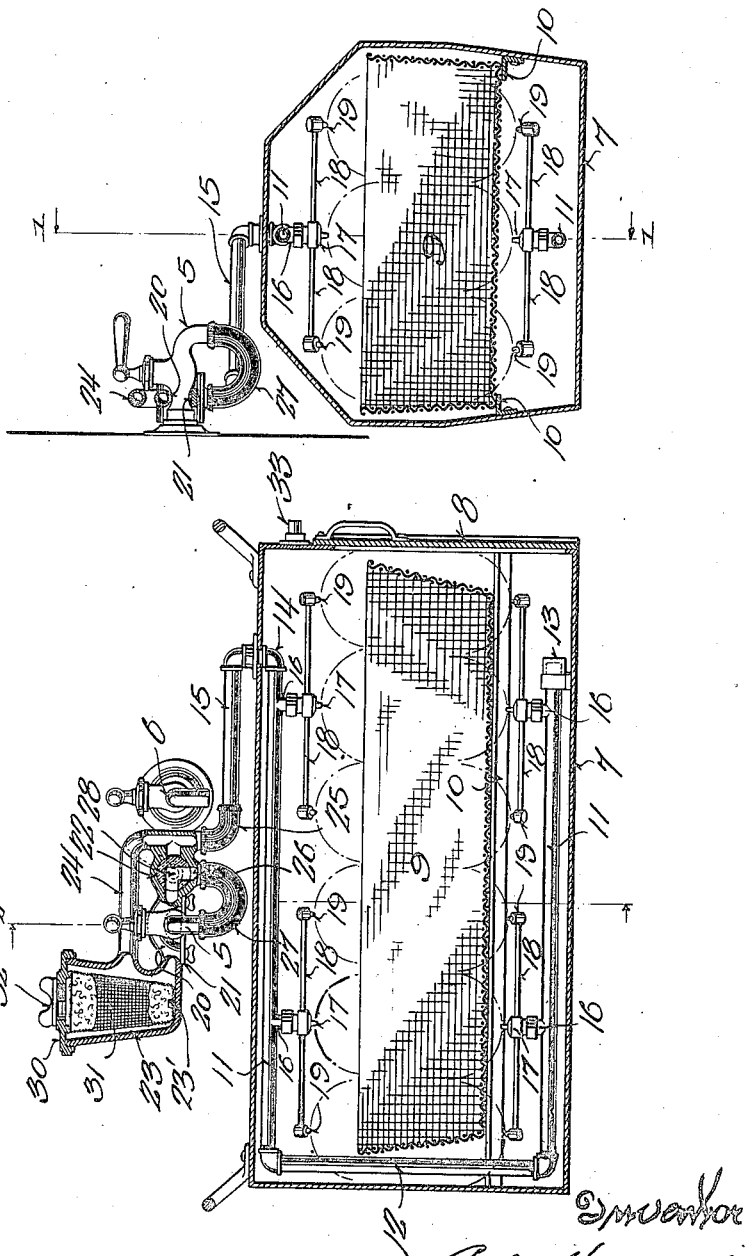

UNITED STATES PATENT OFFICE.

JOHN VAUDREUIL, OF MILWAUKEE, WISCONSIN.

DISH-WASHING MACHINE.

1,262,717.  Specification of Letters Patent.  Patented Apr. 16, 1918.

Application filed April 2, 1917. Serial No. 159,098.

*To all whom it may concern:*

Be it known that I, JOHN VAUDREUIL, a citizen of the United States, and resident of Milwaukee, in the county of Milwaukee and State of Wisconsin, have invented certain new and useful Improvements in Dish-Washing Machines; and I do hereby declare that the following is a full, clear, and exact description thereof.

My invention relates to new and useful improvements in dishwashing machines more particularly of that type adapted to forcibly project water against dishes or other articles therein to be cleaned.

It is in general the object of my invention to provide a simple, efficient, and readily manipulated dish-washing machine which is particularly adapted for household use, although various features of my invention may find valuable application in machines of larger type.

More specifically, it is an object of my invention to provide a dish-washing machine including a casing in which dishes and the like may be first soaked, to soften food matter thereon, and wherein means is provided for forcibly directing water against the dishes and the like upon completion of the soaking operation. In connection with this forcible discharge of water against the dishes and the like, it is further an object to provide a means for varying the direction of flow of the water, so as to insure a positive washing action over the entire surfaces of the articles, and also to provide for the discharge of the water in films or sheets, whereby a sweeping operation is procured with respect to these sheets of water, to further prevent the possibility of any portions of the articles not being engaged by the water.

A further object resides in the provision of an arrangement whereby either soapy or clear water may be applied to the casing, so that efficient rinsing of the dishes and the like may be most conveniently procured subsequent to their being treated by soapy water.

A still further object resides in the provision of a dish-washing machine embodying the aforementioned advantages which may be removably positioned in an ordinary kitchen sink, and which may be detachably connected in a most ready manner with the usual faucets of the sink.

With the above and other objects and advantages in view, the invention resides more particularly in the novel combination, formation and arrangement of parts hereinafter described and particularly pointed out in the appended claims.

In the drawings—

Figure 1 is a vertical longitudinal sectional view through the casing of my improved washing-machine, on the line 1—1 of Fig. 2, the soapy water supply means of the machine being also shown, partly in section.

Fig. 2 is a transverse sectional view through my machine on the line 2—2 of Fig. 1.

Referring now more particularly to the accompanying drawings, 5 and 6 designate respectively the hot and cold water faucets usually associated with an ordinary kitchen sink, and my improved washing machine includes a body casing 7 adapted for removable disposition in the sink (not shown), the upper portion of the casing being reduced in size as shown to provide a clearance for the faucets in its removal from the sink.

This casing 7 is open only at one end, and this end is adapted to be closed by a vertically slidable door 8. Through this open end of the casing is adapted to be inserted a foraminous basket 9 for holding the dishes and other articles to be washed, and this basket is held spaced above the bottom of the casing by angle iron bracket strips 10 secured to the lower portions of the side walls of the casing. Disposed longitudinally in the top and bottom portions of the casing are pipe sections 11 connected at the rear end of the casing by a vertical pipe section 12. The forward end of the lower pipe section is closed by a cap 13 and the forward end of the upper pipe section is connected by suitable elbow coupling 14 with a pipe section 15 extending over the top of the casing, this pipe section 15 being preferably pivotally connected with the coupling whereby to permit movement thereof for most convenient association with the water supply means hereinafter described.

The pipes 11 are provided at spaced intervals with inturned extensions 16 with which are connected in any preferably conventional manner the swivel water discharge heads 17, each of these heads being provided with lateral arms 18, and the heads and the ends of the arms carry discharge nozzles 19, the nozzles of the arms being oppositely inclined whereby upon discharge of water therethrough the heads will be rotated somewhat in the manner of garden sprays. The discharge nozzles however project sheets of water instead of the usual spray jets, and thus upon rotation of the heads 17, the entire area of the respective portions of the basket will be subjected to a positive washing action, the sheets of water having considerable velocity in view of the normal water pressure provided.

For supplying either clear or soapy hot water to the water discharge means, a pipe 20 having its intermediate portion upwardly bowed to embrace the casing of the faucet 5 is secured to said faucet by the clamp plate 21 and at one end of this pipe is provided a valve casing 22, a soap casing 23 upstanding from the other end of the pipe. Extending from the intermediate portion of the soap casing transversely across the faucet 5 is a pipe 24 which communicates with the valve casing at a point diametrically opposite the pipe 20, and this pipe 24 is detachably connected with the pipe 15 of the body casing 7 by a detachable flexible coupling 25. The valve casing is provided with a depending pipe section 26 which is detachably connected with the faucet 5 by a flexible coupling 27. Mounted in the casing 22 is a valve head 28 which is provided with an angular passage, the ends of which are adapted to aline with the pipe 20 and pipe 26 and with the pipe 24 and pipe 26 respectively. A two-way valve is thus provided whereby water from the faucet may be conveyed through the soap casing 23 and pipe 24, or may be conveyed directly to the pipe 24 at its point of communication with the valve casing. The soap casing 23 is preferably of inverted conical shape, and is closed by a cap 30. Disposed in this casing is a foraminous container 31 of inverted conical shape and connected with the cap, this container being retained centrally in the casing by means of the central lug 23' formed on the bottom of the casing and registers with a central opening of the cap which is normally closed by the plug 32 whereby to provide for ready refilling of the container. Thus the water upon entering the soap compartment will flow freely about the foraminous container 31 to dissolve a sufficient amount of soap or other washing material contained therein.

Taking up now the general operation of my machine, a basket of dishes is placed therein and the door 8 of the body casing closed. The casing is then placed in the sink and the valve head 28 operated to discharge soapy water thereinto. This soapy water is projected from the nozzle 19 to procure an initial washing action, but the door being closed, the casing fills with water to the level of an overflow outlet 33 at the upper portion of the casing. With the casing so filled, the dishes are permitted to soak a requisite length of time, and the gate is then opened to empty the casing. Water is then again supplied to the nozzles 19, and the food matter of the dishes and the like, being softened, is thus readily removed. After a sufficient discharge of soapy water, the valve 28 is actuated to discharge clear water for thoroughly rinsing the dishes and the like, and the basket of dishes is then removed, preferably by detaching the connections of the casing with the water supply means and lifting the casing from the sink onto the usual drain board.

While I have shown and described a preferred embodiment of my invention, it is obvious that various changes and modifications of structure to meet different conditions of use may be resorted to without departing in any manner from the spirit of my invention.

I claim:

1. In a device of the character described, means for selectively supplying soapy and clear water comprising a valve head, a casing in communication therewith, a foraminous soap container in said casing and having a filling opening registering with a filling opening in said casing, means for retaining the soap container centrally in said casing, means connecting the valve head with a water supply, and an outlet leading from the valve head and adapted for selective communication with the water supply and said casing.

2. In a device of the character and for the purpose described, means for selectively supplying soapy and clear water comprising a valve head, a soap casing, an inlet and outlet for the casing and in communication with the valve head, a water supply connected with the valve head, an outlet from the valve head and in communication with the outlet for the casing, and means for selectively directing the supply of water through the soap casing and the outlet from the valve head and through the valve head and directly out said outlet.

3. In a device of the character and for the purpose described, means for selectively supplying soapy and clear water comprising a valve head, a soap casing, an inlet and outlet for the casing and communicating with the valve head, said inlet being yoked-shaped for engagement with a water faucet, means engaging the casing and valve head for detachably securing the device to the faucet, a connection from the faucet to the valve head, an outlet from the valve head, and means rotatable in the valve head for selectively directing water from the faucet through the soap casing, through the valve head and directly out of the outlet leading therefrom whereby to selectively supply soapy and clear water.

4. A device of the character described comprising a valve head, a soap casing, inlets and outlets connecting the casing with the valve head and being integral therewith, an outlet leading from the valve head and in alinement with the outlet for the casing, means for securing the device upon a water supply faucet, a return bend connecting the faucet with an inlet leading through the valve head, and means rotatable in the valve head for directing the supply of water whereby to selectively furnish clear and soapy water.

5. In a device of the character described, means for selectively supplying soapy and clear water comprising a valve head, a casing in communication therewith, a foraminous soap container of inverted conical shape in said casing and having its top open and registering with a filling opening in said casing, means connecting the valve head with a water supply faucet, and an outlet leading from the valve head and adapted for selective communication with the faucet and said casing.

In testimony that I claim the foregoing I have hereunto set my hand at Milwaukee, in the county of Milwaukee and State of Wisconsin.

JOHN VAUDREUIL.

Witness:
FRANK S. RATCLIFFE.